US011386132B2

(12) United States Patent
Panineerkandy et al.

(10) Patent No.: US 11,386,132 B2
(45) Date of Patent: Jul. 12, 2022

(54) SYSTEM AND METHOD FOR RETRIEVING RESULTS AND RESPONSES WITH CONTEXT BASED EXCLUSION CRITERIA (71) Applicant: International Business Machines Corporation, Armonk, NY (US)

(72) Inventors: Praveena Viswanathan Panineerkandy, Cary, NC (US); Sujatha B. Perepa, Durham, NC (US); Devasena Vridhachalam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/870,724

(22) Filed: May 8, 2020

(65) Prior Publication Data
US 2021/0349925 A1  Nov. 11, 2021

(51) Int. Cl.
G06F 16/00 (2019.01)
G06F 16/33 (2019.01)
G06F 16/332 (2019.01)
G06F 16/901 (2019.01)

(52) U.S. Cl.
CPC ...... *G06F 16/3344* (2019.01); *G06F 16/3329* (2019.01); *G06F 16/9024* (2019.01)

(58) Field of Classification Search
CPC ............. G06F 16/3344; G06F 16/3329; G06F 16/9024
USPC ......................................................... 707/771
See application file for complete search history.

(56) References Cited

U.S. PATENT DOCUMENTS

| 7,376,634 | B2* | 5/2008 | Liu .......................... G09B 7/00 706/61 |
| 9,483,530 | B1 | 11/2016 | Lamping |
| 10,013,450 | B2* | 7/2018 | Clark ................... G06F 16/2468 |
| 10,229,188 | B2* | 3/2019 | Cortis ................... G06F 16/334 |
| 10,248,738 | B2* | 4/2019 | Clark ................... G06F 16/9024 |
| 10,275,456 | B2* | 4/2019 | Ezen Can ............. G06N 5/022 |
| 10,423,725 | B2 | 9/2019 | Zhou |
| 10,783,179 | B2* | 9/2020 | Akolkar ................ G06F 16/345 |

(Continued)

OTHER PUBLICATIONS

Tanvi Hardeniya et al., "An Approach to Sentiment Analysis Using Lexicons With Comparative Analysis of Different Techniques", IOSR Journal of Computer Engineering (IOSR-JCE), e-ISSN: 2278-0661, p-ISSN: 2278-8727, vol. 18, Issue 3, Ver. 1 (May-Jun. 2016), pp. 53-57.*

(Continued)

*Primary Examiner* — Monica M Pyo
(74) *Attorney, Agent, or Firm* — Terrile, Cannatti & Chambers, LLP; Emmanuel A. Rivera (57) ABSTRACT A method, system, and computer-usable medium are disclosed for processing a search query that includes context based exclusion criteria. A search query is analyzed as to a subject, topic, noun phrase and query intent. Negative exclusion context and emphasis of the search query are determined with a filter word list to refine the query intent. A knowledge graph is created based on the search query. A set of branches of the knowledge graph is determined from which information is retrieved. Negative intent branches are identified based on the exclusion context and pruning is performed on the negative intent branches from the knowledge graph.

20 Claims, 5 Drawing Sheets (56) References Cited

U.S. PATENT DOCUMENTS

2016/0378851 A1* 12/2016 Merdivan .......... G06F 16/3344
  707/722
2018/0300580 A1* 10/2018 Bradford ................ G06N 20/00
2019/0236140 A1* 8/2019 Canim .................... G06F 40/30
2019/0303498 A1 10/2019 Saha

OTHER PUBLICATIONS

Chapman, Wendy W. et al., A Simple Algorithm for Identifying Negated Findings and Diseases in Discharge Summaries, Journal of Biomedical Informatics 34(5):301-310, Nov. 2001.
Bilotti, Matthew et al., Structured Retrieval for Question Answering, SIGIR '07, Jul. 23-27, 2007.
Pandya, Kadi Sarva et al., Weight based Ontology Pruning using Analysis of Inference Engines for Semantic Web, International Journal of Science and Research (IJSR), vol. 3, Issue 5, May 2014.
Zhao, Shi et al., Tailor knowledge graph for query understanding: linking intent topics by propagation, Proceedings of the 2014 Conference on Empirical Methods in Natural Language Processing (EMNLP), pp. 1070-1080, 2014.
Rob High, "The Era of Cognitive Systems: An Inside Look at IBM Watson and How it Works," IBM Redbooks, 2012.
Michael Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

SYSTEM AND METHOD FOR RETRIEVING RESULTS AND RESPONSES WITH CONTEXT BASED EXCLUSION CRITERIA

BACKGROUND OF THE INVENTION

Field of the Invention

The present invention relates in general to the field of computers and similar technologies, and in particular to software utilized in this field. Still more particularly, it relates to a method, system and computer-usable medium for searching for and retrieving results and responses using context based exclusion criteria.

Description of the Related Art

With the increased usage of computing networks, such as the Internet, users rely on search engines and searching technology to find relevant results to their queries. For example, typical search and discovery engines rely on and provide acceptable results based on positive queries. An example of a positive query being "search for animals that are dogs." Typical search and discovery engines implement keyword based searching.

Such search and discovery engines fail to provide acceptable results when exclusion queries are used. An example of an exclusion query being "search for animals that are not dogs." Since these search and discovery engines implement keyword based searching, the query phrase is typically parsed, and results are for each of the tokens. When a search query includes a token, such as "not", "without", etc., the token may be used as a stop word or an included keyword. Therefore, for such exclusion queries, there can be incorrect results. In certain instances, opposite results can take place. For example, for the exclusion query "search for animals that are not dogs", the returned result can be animals including dogs. Furthermore, results can include irrelevant outcomes that a user has to sift through and negating the usefulness of a search and discovery engine.

SUMMARY OF THE INVENTION

A method, system, and computer-usable medium are disclosed for processing a search query that includes context based exclusion criteria that comprises analyzing the search query as to a subject, topic, noun phrase and query intent; determining a negative exclusion context and emphasis of the search query with a filter word list to refine the query intent; creating a knowledge graph based on the search query; determining a set of branches of the knowledge graph from which information s retrieved; identifying negative intent branches based on the exclusion context and pruning the negative intent branches from the knowledge graph.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present application relates generally to improving searching for and retrieving results and responses of exclusion based queries. In particular, exclusion criteria are used for queries. Consideration is taken as to semantics, context, and sequence of requests or queries, as well as exclusion criteria.

In certain embodiments, a parsing mechanism or natural language processing (NLP) parser, identifies inclusion/exclusion criteria that are omitted as stop words (e.g., "not", "without", "but", etc.). The parsing mechanism leverages a user and/or system defined filter word list and applies weight based pruning to knowledge graph or ontology set. The knowledge graph or ontology set is pruned using negative branching.

Therefore, when exclusion criteria searches or queries are performed, false positives can be eliminated. Results can be representative of more inclusive and exclusive searches. A more descriptive and decisive ontology is implemented. The use of weight based pruning and negative branching allows for less traversing of paths of knowledge graph. By loading less result data (i.e., eliminating unwanted result data) resources are maximized and response time can be reduced. Furthermore, such methods allow for a better understanding/implementation of Natural Language Querying (NLQ).

Figure 1:
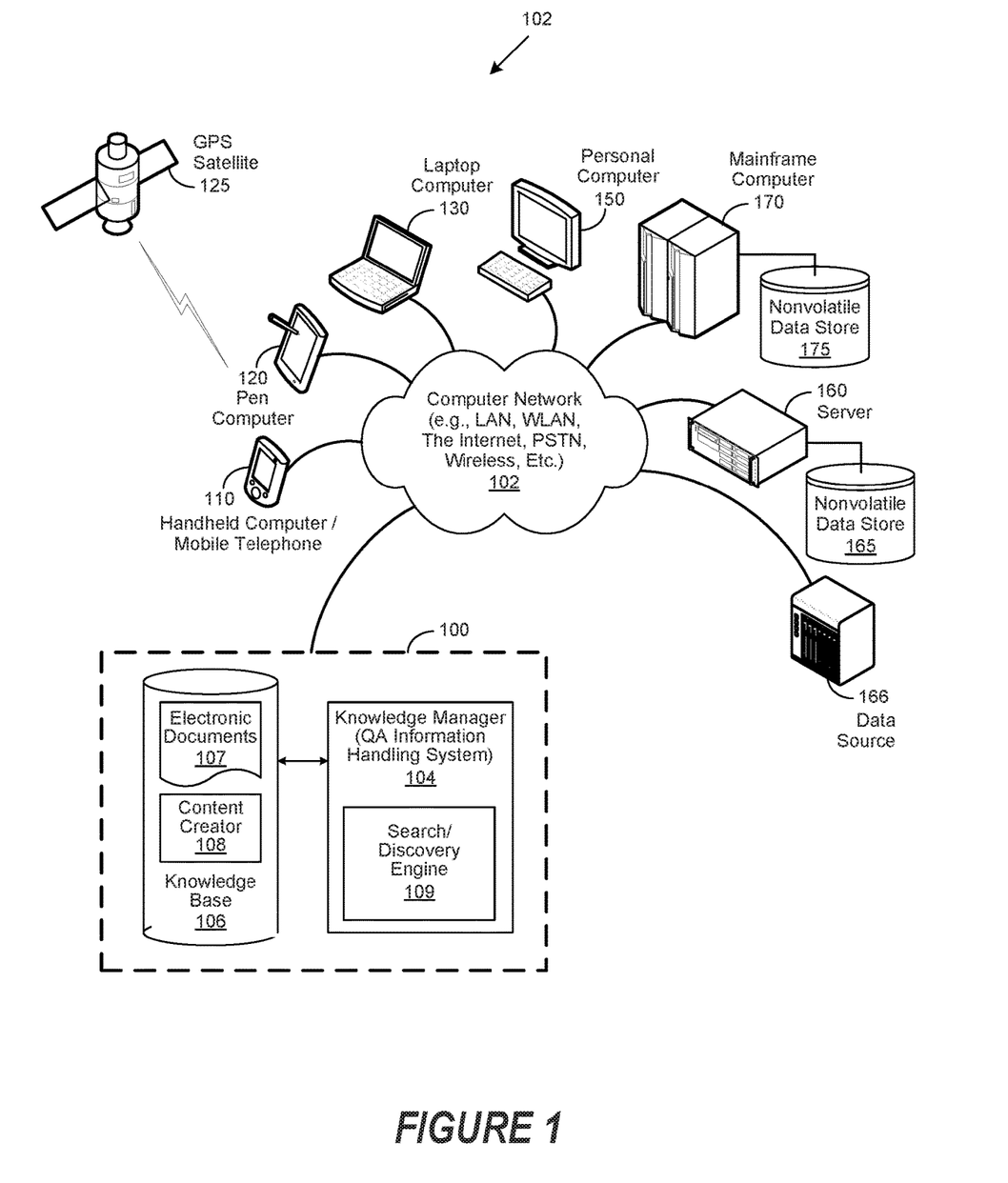
FIG. 1 depicts a network environment that includes a knowledge manager that utilizes a knowledge base.

FIG. 1 depicts a schematic diagram of one illustrative embodiment of a knowledge manager system (e.g., a question/answer system) 100 which is instantiated in a distributed knowledge manager in a computer network environment 102. One example of a question/answer generation which may be used in conjunction with the principles described herein is described in U.S. Patent Application Publication No. 2011/0125734, which is herein incorporated by reference in its entirety. Knowledge manager 100 may include a knowledge manager information handling system computing device 104 (comprising one or more processors and one or more memories, and potentially any other computing device elements generally known in the art including buses, storage devices, communication interfaces, and the like) connected to a network 102. The network environment 102 may include multiple computing devices in communication with each other and with other devices or components via one or more wired and/or wireless data communication links, where each communication link may comprise one or more of wires, routers, switches, transmitters, receivers, or the like. Knowledge manager 100 and network environment 102 may enable question/answer (QA) generation functionality for one or more content users. Other embodiments of knowledge manager 104 may be used with components, systems, sub-systems, and/or devices other than those that are depicted herein.

Knowledge manager 104 may be configured to receive inputs from various sources. For example, knowledge manager 104 may receive input from the network 102, a knowledge base 106 which can include a corpus of electronic documents 107 or other data, a content creator 108, content users, and other possible sources of input. In various embodiments, the other possible sources of input can include location information. In one embodiment, some or all of the inputs to knowledge manager 104 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 102 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with knowledge manager 104. The electronic documents 107 may include any file, text, article, or source of data for use in knowledge manager 100. Content users may access knowledge manager 104 via a network connection or an Internet connection (represented as to the network 102) and may input questions to knowledge manager 100 that may be answered by the content in the corpus of data. As further described below, when a process can implement a query with exclusion criteria from the knowledge manager. Certain embodiments provide for Natural Language Processing (NLP), such that knowledge manager 100 can be considered as an NLP system, which in certain implementations performs the methods described herein. In one embodiment, the process sends queries in the form of natural language questions, etc.) to the knowledge manager 104. Knowledge manager 104 may interpret the question/query and provide a response to the content user containing one or more answers/results to the question/query. In some embodiments, knowledge manager 104 may provide a response to users in a ranked list of answers. Knowledge manager 104 further includes search/discovery engine 109.

One such knowledge management system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

In some illustrative embodiments, knowledge manager 104 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds, or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson™ and Healthcare," IBM developerWorks, 2011 and "The Era of Cognitive Systems: An Inside Look at IBM Watson™ and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. In certain embodiments, the location information is determined through the use of a Geographical Positioning System (GPS) satellite 125. In these embodiments, a handheld computer or mobile telephone 110, or other device, uses signals transmitted by the GPS satellite 125 to generate location information, which in turn is provided via the network 105 to the knowledge manager system 100 for processing. As shown, the various information handling systems can be networked together using network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
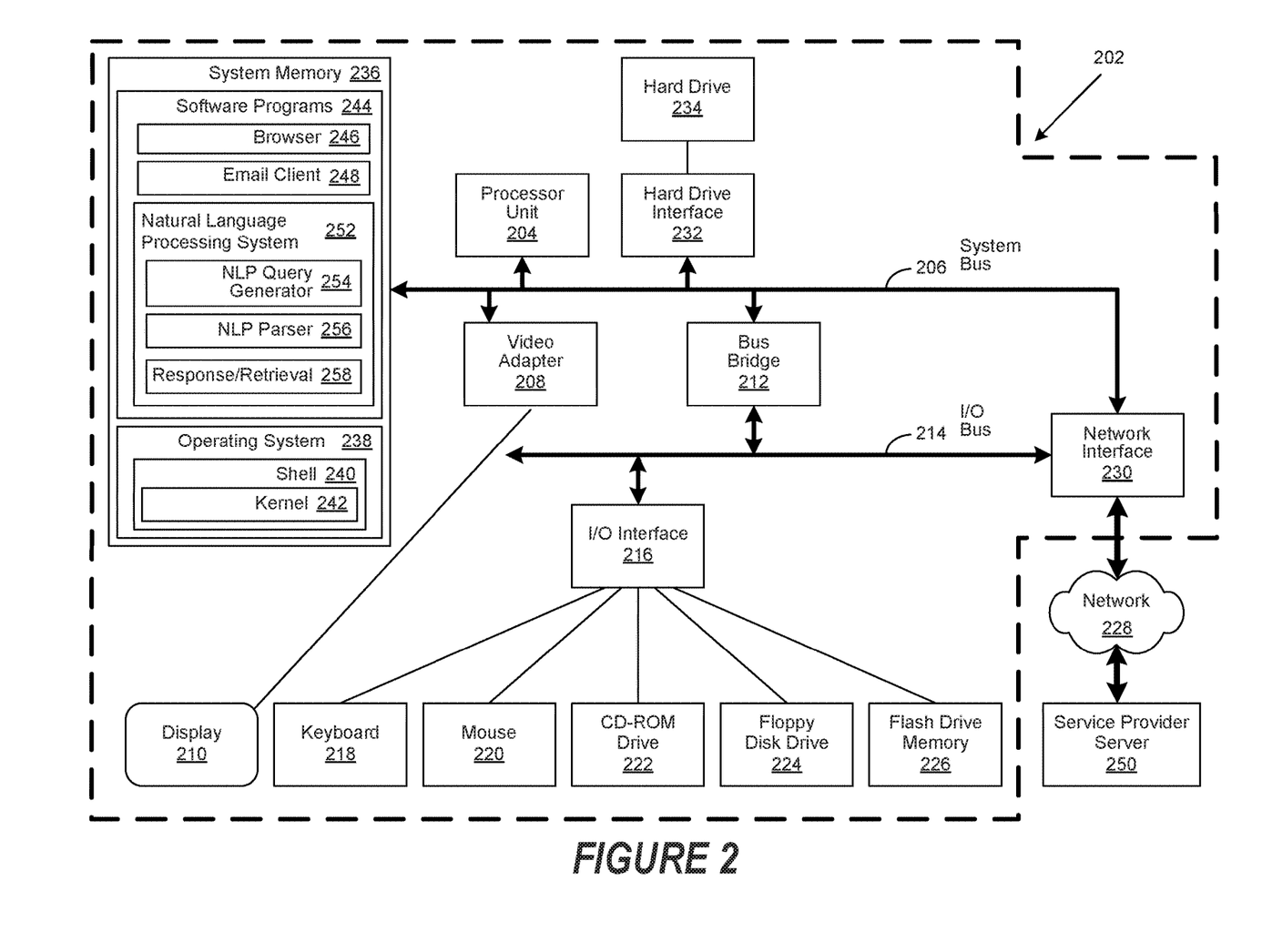
FIG. 2 is a simplified block diagram of an information handling system capable of performing computing operations.

FIG. 2 illustrates an information processing handling system 202, more particularly, a processor and common components, which is a simplified example of a computer system capable of performing the computing operations described herein. Information processing handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing information handling system 202 is able to communicate with a service provider server 250 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 250.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing information handling system 202) to send and receive network messages to the Internet using Hyper Text Transfer Protocol (HTTP) messaging, thus enabling communication with service provider server 250. In various embodiments, software programs 244 may also include a natural language processing (NLP) system 252. In various implementations, the NLP system 252 can include a natural language processing (NLP) query generator module 254, natural language processing (NLP) parser 256, and response/retrieval component 258. The components of NLP system 252 and the search/discovery engine 109 as described in FIG. 1 (collectively referred to as query agents) are configured to respond to direct queries without exclusions, and in particular recognize the exclusion criteria and respond accordingly. As further described herein, in the implementation of natural language processing (NLP), query sentences (searches) are preprocessed. During preprocessing, words in a "stop word" list are removed during indexing. However, consideration is made that removing certain "stop words" can change the intent of the query, especially "stop words" having a negative intent and context. Therefore, the query agents are configured to recognize exclusion criteria and respond accordingly and filter out information proactively and not reactively.

In these and other embodiments, the natural language processing system 252 includes code for implementing the processes described herein below. In one embodiment, the information processing information handling system 202 is able to download the natural language processing system 252 from the service provider server 250.

The hardware elements depicted in the information processing information handling system 202 are not intended to be exhaustive, but rather are representative to highlight components used by the present invention. For instance, the information processing information handling system 202 may include alternate memory storage devices such as magnetic cassettes, Digital Versatile Disks (DVDs), Universal Serial Bus (USB) drives, Secure Digital (SD) cards, Solid State Drive (SSD), and the like. These and other variations are intended to be within the spirit, scope and intent of the present invention.

Figure 3:
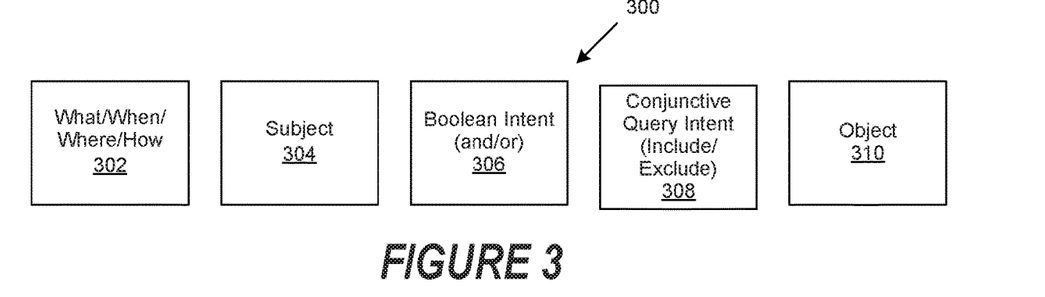
FIG. 3 is a generalized algorithm used in the methods described herein.

FIG. 3 shows components of an algorithm used in the methods described herein. In particular, during NLP preprocessing, the search query is parsed per the algorithm 300. Algorithm 300 includes "what/where/when/how" component 302, "subject" component 304, "Boolean intent (and/or)" component 306, "conjunctive query intent (include/exclude)" component 308, and "object" component 310.

As an example, consider the search query "Pictures of flowers without blue flowers." "Pictures" is a "what" of component 302; "flowers" is a "subject" of component 304; "without" is a "conjunctive query intent" of component 308; and "blue flowers" is an objective phrase of component 310. The "Boolean intent" component 306 would include either an "and" or "or". In this example, there is neither an "and" nor an "or". As further described herein, the use of a filter word list is implemented. The word "of" in the search query does not match with any words in the filter word list and is ignored.

As to the "conjunctive query intent" component 309, in certain cases, a search query includes a topic intent and query intent, for example, "pictures of dogs but not with roses in picture." The topic intent and query intent should match. Criteria is used as a feature, but not as a stop word. Stop words are not excluded, but words of the filter word list are used. As further described herein, negative branching (pruning) is implemented. Results are filtered in the end result.

Figure 4:
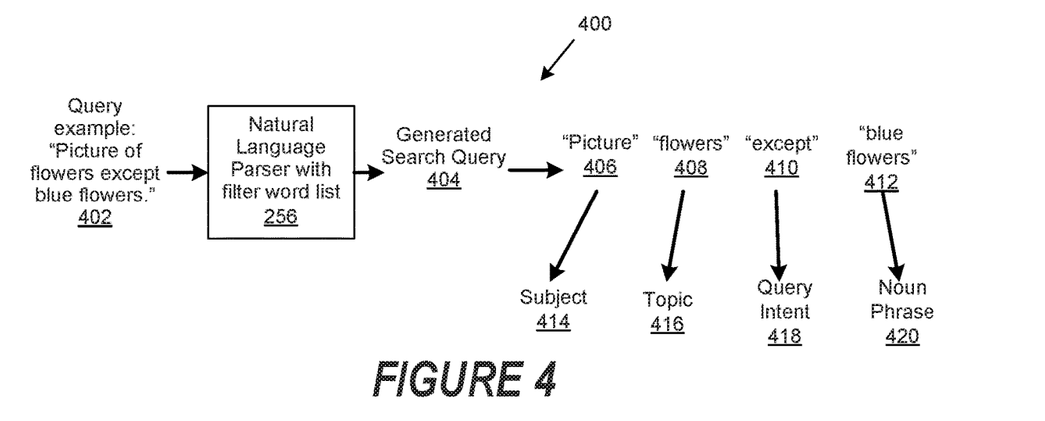
FIG. 4 is process of a natural language processing parser.

FIG. 4 shows a process of NLP parser 256. The process 400 begins with the search query 402 of "Picture of flowers except blue flowers". NLP parser 256 implements the filter word list which can be system or user defined. An example of such a filter word list is the following: "does not", "doesn't", "with", "without", "can", "cannot", "contains", "excludes", "excluding", "includes", "including", "not". NLP parser 256 with the filter word list provides a generated search query 404, which includes "Picture" 406, "flowers" 408, "except" 410, and "blue flowers" 412. "Picture" 406 is identified as a "subject" 420, "flowers" 408 is identified as a "topic" 416, "except" 410 is identified as a "query intent" 424, and "blue flowers" 412 is identified as a "noun phrase" 426.

Figure 5:
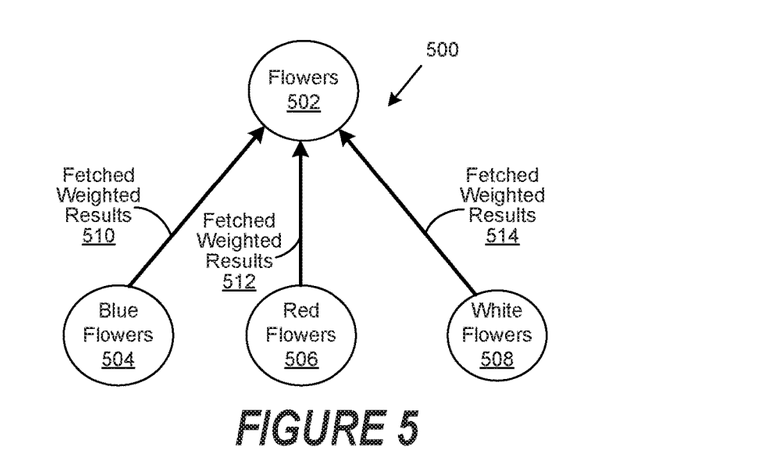
FIG. 5 is knowledge graph or ontology set of results for a search query.

FIG. 5 shows an example knowledge graph or ontology set of results for a search query. In this example, knowledge graph 500 includes a class "flowers" 502, which subclasses or child nodes "blue flowers" 504, "red flowers" 506, and "white flowers" 508. As described, the subclasses or child nodes 504, 506 and 508 are given a weight of "1" or "0". Branches 510, 512 and 514 provide results based on the weights assigned to subclasses or child nodes 504, 506 and 508. Results can be a corpus that includes "body of works", "set of documents", etc. And in this example, "pictures of flowers."

Therefore, the methods described include identifying the intent of the query, which can include positive or negative exclusion conditions. Identifying an exclusion value or the keyword to be excluded or included. Applying a filter to the search query. Results are retrieved with weight based pruning and negative branching.

When identifying a filter condition, during NLP preprocessing, the search query is parsed as described in FIGS. 3 and 4. Negative stop words are checked against the filter word list to find an existing filter word. Identification is performed as to the conjunctive intent of the filter word.

In identifying the filter value, the "noun phrase", for example "blue flowers" in the example, next to the identified filter word is identified and added to the create the search query. Therefore, a filter condition is created. For example, "show me the pictures of flowers, except blue flowers."

The filter word is applied to the search query. In the knowledge graph or ontology set, as described in FIG. 5. The parent class or node contains a list of all available subclasses or child nodes. When reading through the knowledge graph or ontology set, the filter condition is applied. At each class or parent node, the list of subclasses or child nodes are scanned to check if a filter value is present, and if so, the required filter condition is applied. If the filter condition is a negative intent, then the weight of the subclass or child node is set to "0". Otherwise, if a positive intent, the weight is set to "1" or increased. The weighting is used to prune results from the knowledge graph or ontology set.

Figure 6:
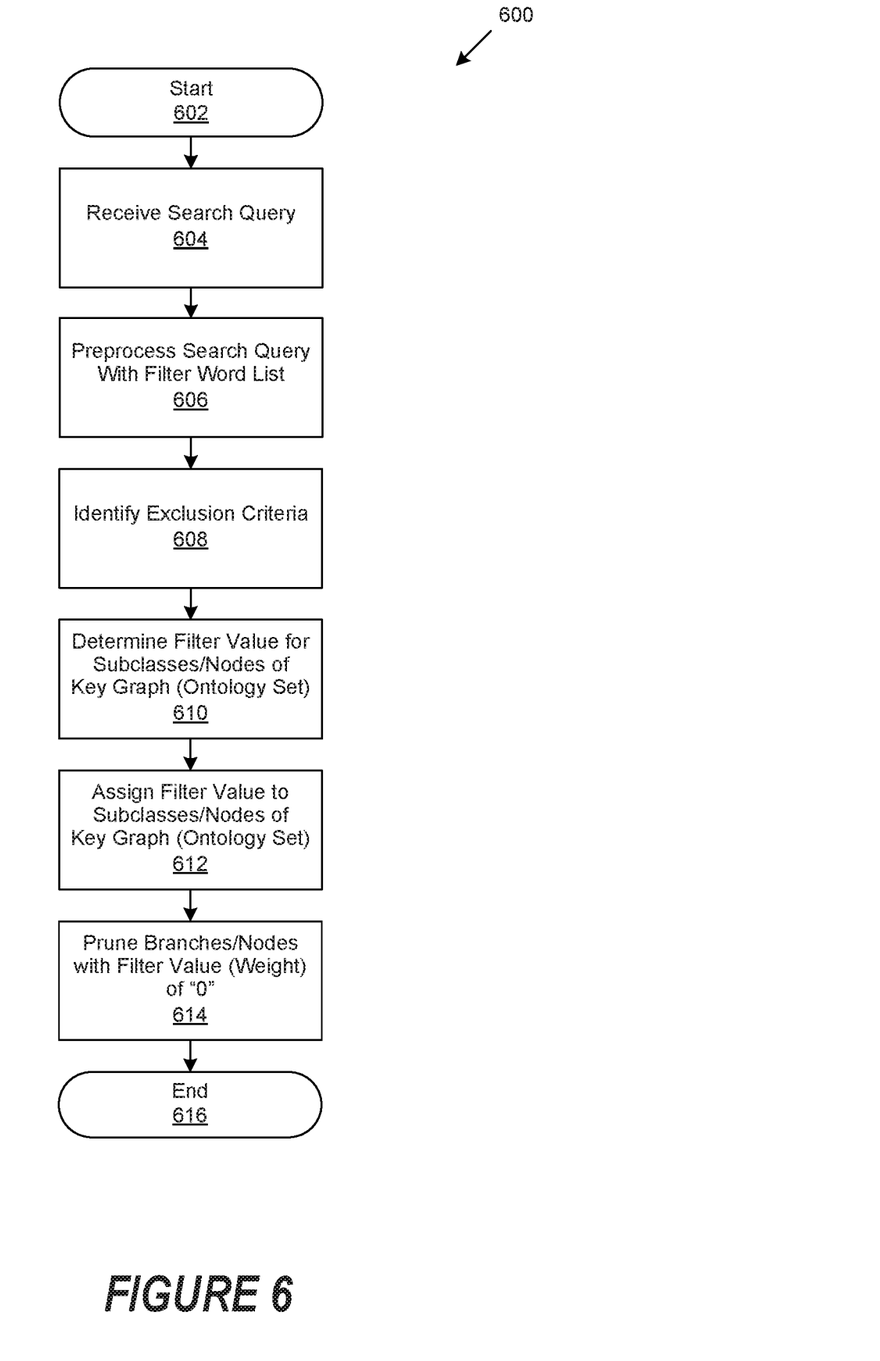
FIG. 6 is a generalized flow chart searching for and retrieving results and responses using context based exclusion criteria.

FIG. 6 is a generalized flowchart 600 for searching for and retrieving results and responses using context based exclusion criteria. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, a search query is received. The search query or sentence can be received from a user and entered as a natural language construct. At step 606, preprocessing is performed on the search query using a filter word list. At step 608, identifying presence of exclusion criteria is performed based on the preprocessing. At step 610, determining is performed as to a filter value for subclasses or child nodes of a class or parent node in a knowledge graph or ontology set. In certain implementations, the filter value is found by parsing the search query or sentence after the exclusion criteria and the noun phrase. At step 612, filter values are assigned, "0" for exclusion and "1" for inclusion. The filter values are assigned while processing the knowledge graph or ontology set. At step 614, pruning is performed of branches of subclasses or child nodes. Branches with filter values of "0" are excluded from final results that are returned. At step 616, the process 600 ends.

Figure 7:
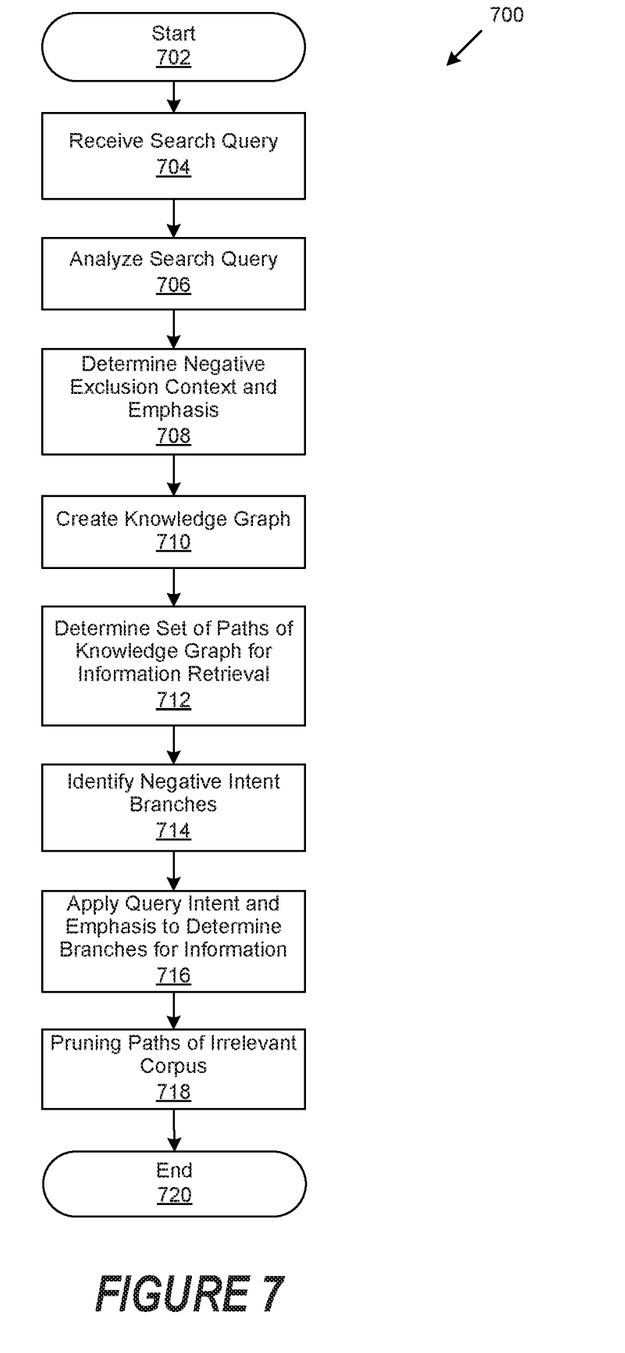
FIG. 7 is a generalized flow chart for processing queries utilizing a filter word list and weighted exclusions.

FIG. 7 is a generalized flowchart 700 for processing queries utilizing a filter word list and weighted exclusions. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 702, the process 700 starts. At step 704, a search query is received. The search query can be from a user of a system as described herein. At step 706, the search query is analyzed to determine a subject, topic, noun phrase and query intent. At step 708, determining a negative exclusion context and emphasis is performed using a filter word list. The emphasis can be used to refine query intent. Query intent can be identified by the filter word list. At step 710, a knowledge graph or ontology set is created based on the search query. At step 712, determining is performed as to a set of paths or branches of the knowledge graph or ontology set from which information (i.e., corpus) retrieval is available. At step 714 identifying negative intent branches of the knowledge graph is performed. The negative branches are excluded from the search query. At step 716, the query intent and emphasis are applied to the knowledge graph to determine potential branches to retrieve information related to the search query. At step 718, pruning is performed of the negative intent branches. Therefore, eliminating the requirement of filtering of results after fetching the entire set of information and avoiding providing irrelevant results to users. At step 720, the process 700 ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for processing in sentiment detection comprising:
    analyzing through a knowledge management system that includes a knowledge manager, received search query as to a subject, topic, noun phrase and query intent, wherein the query intent includes positive and negative exclusion criteria;
    during pre-processing of the received search query, removing, by the knowledge manager words in a stop word list during indexing, wherein stop words have a negative intent and context;
    creating, by the knowledge manager a knowledge graph based on the received search query;
    determining, by the knowledge manager a set of branches of the knowledge graph from which information is retrieved;
    identifying, by the knowledge manager negative intent branches based on the positive and negative exclusion criteria;
    applying, by the knowledge manager a parsing mechanism that identifies inclusion and exclusion criteria omitted as stop words and prunes the knowledge graph;
    recognizing, by the knowledge manager exclusion criteria based on the stop words and filtering content based on a filter word list; and
    determining, by the knowledge manager a negative exclusion context and emphasis of the received search query with the filter word list to refine the query intent.

2. The method of claim 1, wherein query intent is identified by the filter word list.

3. The method of claim 1, wherein the analyzing includes parsing the received search query using the parsing mechanism as to subject, topic, noun phrase and query intent.

4. The method of claim 1, wherein the received search query includes inclusion and exclusion criteria.

5. The method of claim 1, wherein the identifying negative intent branches includes assigning a weight of zero "0" to negative intent branches.

6. The method of claim 1, wherein the information retrieved is a corpus of data.

7. The method of claim 1 further comprising preprocessing the received search query, removing stop words if the query intent is not changed.

8. A system comprising:
    a processor;
    a data bus coupled to the processor; and
    a non-transitory computer-usable medium embodying computer program code, the computer-usable medium being coupled to the data bus, the computer program code used for processing in sentiment detection and comprising instructions executable by the processor and configured for:
    analyzing through a knowledge management system that includes a knowledge manager, received search query as to a subject, topic, noun phrase and query intent, wherein the query intent includes positive and negative exclusion criteria;
    during pre-processing of the received search query, removing, by the knowledge manager words in a stop word list during indexing, wherein stop words have a negative intent and context;
    creating, by the knowledge manager a knowledge graph based on the received search query;
    determining, by the knowledge manager a set of branches of the knowledge graph from which information is retrieved;
    identifying, by the knowledge manager negative intent branches based on the positive and negative exclusion criteria;
    applying, by the knowledge manager a parsing mechanism that identifies inclusion and exclusion criteria omitted as stop words and prunes the knowledge graph;
    recognizing, by the knowledge manager exclusion criteria based on the stop words and filtering content based on a filter word list; and
    determining, by the knowledge manager a negative exclusion context and emphasis of the received search query with the filter word list to refine the query intent.

9. The system of claim 8, wherein query intent is identified by the filter word list.

10. The system of claim 8, wherein the analyzing includes parsing the received search query using the parsing mechanism as to subject, topic, noun phrase and query intent.

11. The system of claim 8, wherein the identifying negative intent branches includes assigning a weight of zero "0" to negative intent branches.

12. The system of claim 8, wherein the search query includes inclusion and exclusion criteria.

13. The system of claim 8, wherein the information retrieved is a corpus of data.

14. The system of claim 8, further comprising preprocessing the search query removing stop words if the query intent is not changed.

15. A non-transitory, computer-readable storage medium embodying computer program code, the computer program code comprising computer executable instructions configured for:
    analyzing through a knowledge management system that includes a knowledge manager, received search query as to a subject, topic, noun phrase and query intent, wherein the query intent includes positive and negative exclusion criteria;
    during pre-processing of the received search query, removing, by the knowledge manager words in a stop word list during indexing, wherein stop words have a negative intent and context;
    creating, by the knowledge manager a knowledge graph based on the received search query;
    determining, by the knowledge manager a set of branches of the knowledge graph from which information is retrieved;
    identifying, by the knowledge manager negative intent branches based on the positive and negative exclusion criteria;
    applying, by the knowledge manager a parsing mechanism that identifies inclusion and exclusion criteria omitted as stop words and prunes the knowledge graph;
    recognizing, by the knowledge manager exclusion criteria based on the stop words and filtering content based on a filter word list; and
    determining, by the knowledge manager a negative exclusion context and emphasis of the received search query with the filter word list to refine the query intent.

16. The non-transitory, computer-readable storage medium of claim 15, wherein query intent is identified by the filter word list.

17. The non-transitory, computer-readable storage medium of claim 15, wherein the analyzing includes parsing the received search query using the parsing mechanism as to subject, topic, noun phrase and query intent.

18. The non-transitory, computer-readable storage medium of claim 15, wherein the received content includes inclusion and exclusion criteria.

19. The non-transitory, computer-readable storage medium of claim 15, wherein the identifying negative intent branches includes assigning a weight of zero "0" to negative intent branches.

20. The non-transitory, computer-readable storage medium of claim 15 further comprising preprocessing the received search query, removing stop words if the query intent is not changed.

* * * * *